United States Patent
Daigre

(10) Patent No.: US 7,513,111 B2
(45) Date of Patent: Apr. 7, 2009

(54) SHOCK VALVE FOR HYDRAULIC DEVICE

(75) Inventor: Richard Daigre, Hopkinsville, KY (US)

(73) Assignee: White Drive Products, Inc., Hopkinsville, KY (US)

(*) Notice: Subject to any disclaimer, the term of this patent is extended or adjusted under 35 U.S.C. 154(b) by 0 days.

(21) Appl. No.: 11/742,969

(22) Filed: May 1, 2007

(65) Prior Publication Data

US 2007/0267068 A1    Nov. 22, 2007

Related U.S. Application Data

(60) Provisional application No. 60/747,639, filed on May 18, 2006.

(51) Int. Cl.
*E02F 9/22* (2006.01)
*F15B 11/00* (2006.01)

(52) U.S. Cl. .......................................... 60/468; 137/493

(58) Field of Classification Search .................. 60/468, 60/469, 494; 137/493, 493.6, 493.9
See application file for complete search history.

(56) References Cited

U.S. PATENT DOCUMENTS

| | | | | |
|---|---|---|---|---|
| 3,067,770 | A * | 12/1962 | Fancher | 137/493 |
| 3,286,645 | A | 11/1966 | Albers | |
| 4,044,791 | A * | 8/1977 | McKenzie | 137/493.9 |
| 4,317,467 | A * | 3/1982 | Heyland | 137/493 |
| 4,428,396 | A * | 1/1984 | Wall | 137/493.9 |
| 4,519,755 | A | 5/1985 | Hanson | |
| 4,628,690 | A * | 12/1986 | Arai et al. | 60/468 |
| 5,183,075 | A * | 2/1993 | Stein | 137/493.6 |
| 5,765,590 | A * | 6/1998 | Kim et al. | 137/493.9 |
| 6,216,729 | B1 * | 4/2001 | Hambly et al. | 137/493 |
| 6,339,929 | B1 * | 1/2002 | Udagawa et al. | 60/468 |
| 6,408,871 | B1 * | 6/2002 | Ryerson et al. | 137/493.9 |
| 6,474,064 | B1 * | 11/2002 | Heyne et al. | 60/468 |
| 6,826,908 | B1 | 12/2004 | Stafford | |
| 6,941,687 | B2 * | 9/2005 | Sharkness et al. | 60/469 |
| 7,234,487 | B2 * | 6/2007 | Jacobson et al. | 137/493 |
| 7,392,823 | B2 | 7/2008 | Dong et al. | |
| 2001/0032675 | A1 * | 10/2001 | Russell | 137/493.9 |
| 2005/0088041 | A1 | 4/2005 | Dong et al. | |

* cited by examiner

*Primary Examiner*—Thomas E Lazo
(74) *Attorney, Agent, or Firm*—Fay Sharpe LLP

(57) ABSTRACT

A shock valve assembly for a hydraulic system includes a fluid path extending between a first port and a second port with a shock valve disposed in the fluid path to normally block fluid flow through the fluid path between the first and second ports. The shock valve temporarily opens to permit fluid flow between the first port and a second port through the fluid path when a fluid pressure differential between the ports exceeds a predetermined threshold. Fluid flow occurs in a first direction from the first port to the second port through the fluid path when the shock valve is temporarily opened and fluid pressure in the first port is greater than the second port. Fluid flow occurs in a second, reverse direction through the fluid path from the second port to the first port when the shock valve is temporarily opened and fluid pressure in the second port is greater than the first port.

24 Claims, 9 Drawing Sheets

SHOCK VALVE FOR HYDRAULIC DEVICE

The present application claims the benefit of U.S. Provisional Application No. 60/747,639, filed May 18, 2006, which is incorporated herein by reference in its entirety.

BACKGROUND

Riding lawn mowers and similar vehicles are typically driven by hydrostatic transmissions. These known transmissions typically include a hydraulic pump. The input shaft of the pump is coupled to an internal combustion engine so that the pump works to deliver fluid to a hydraulic motor. The output shaft of the motor is coupled to a vehicle wheel.

Any shock load to the hydraulic motor, e.g. in the form of an impediment to the rotation of the wheels, can impart a shock load to the entire hydraulic transmission. This shock load typically in the form of excessive pressure, can negatively affect the components to the hydrostatic transmission. Many known designs of hydraulic transmissions do not integrate components, such as relief valves or shock valves, to protect the pump and/or the hydraulic motor, as well as the other components of the hydraulic system.

Some known system designs that have incorporated relief valves into the hydraulic transmission have positioned the relief valve within the pump. Such a design protects the pump from shock loads but typically does not protect the other components, e.g. the hydraulic motor, that first experiences the shock. Specifically, if the output shaft of the hydraulic motor experiences any sudden resistance, then a surge of pressure initially will travel through the motor possibly causing damage. The pressure spike may also damage other components between the motor and pump prior to being dissipated within the pump.

Other known system designs include two one-way relief valves disposed in the fluid path in the hydraulic motor. A first relief valve allows pressure to flow in one direction in response to a pressure spike and a second relief valve allows pressure to flow in the opposite direction in response to a pressure spike. This system requires the use of two valves. It also does not allow for adjustment of the load at which the valve will allow fluid to pass, other than exchanging the biasing portion of the valve with a different biasing portion.

SUMMARY

A valve and system that overcomes the aforementioned shortcomings is described below. Such a valve can be described as a bi-directional valve assembly disposed in a fluid path between a first fluid port, e.g. inlet port, and a second fluid port, e.g. outlet port, in a hydraulic device, e.g. a hydraulic motor, a hydraulic pump (which can be the same as a motor where the output shaft is connected to an engine), a manifold, etc. The valve can be disposed directly within the housing of the hydraulic device, or the valve can be disposed next to the housing of the hydraulic device, for example the valve assembly could attach to the housing of the hydraulic device in a retrofit application.

More particularly, the bi-directional valve assembly can block fluid flow through a passage in a first direction in response to a greater pressure acting on a first side of the valve assembly as compared to a second side of the valve assembly (the second side being opposite the first side). When the fluid pressure acting on the first side of the valve assembly reaches a predetermined pressure, for example when a hydraulic motor abruptly stops, the valve assembly can open to allow fluid to pass through the valve until the pressure is released and the pressure acting on the first side of the valve assembly decreases below the predetermined pressure. Additionally, the valve assembly can block fluid flow through the passage in a second direction in response to a greater pressure acting on the second side of the valve assembly as compared to the first side of the valve assembly. When the fluid pressure acting on the second side of the valve assembly reaches a predetermined pressure, the valve assembly can open to allow fluid to pass through the valve until the pressure is released and the pressure acting on the second side of the valve assembly decreases below the predetermined pressure.

An example of such a shock valve assembly includes a first component (or components) configured to move in response to a first pressure differential across the valve assembly in a first direction and a second component (or components) configured to move in relation to the first component in response a second pressure differential across the valve assembly in the first direction. The second pressure differential is greater than the first pressure differential. The first component includes a poppet member, which in the depicted embodiment includes a first poppet member and second poppet member, that moves toward a respective valve seat in response to the first pressure differential across the valve assembly in the first direction. The second component includes a third poppet member, which in the depicted embodiment is a fastener, that moves in relation to the first poppet member and the second poppet member in response to the second pressure differential across the valve assembly in the first direction. The first component blocks fluid flow in the first direction in response to a pressure being exerted on a first side of the valve assembly that is greater than a pressure being exerted on a second, opposite side of the valve assembly. The second component can move with respect to the first component when a pressure being exerted on the first side of the valve assembly exceeds a predetermined pressure differential with respect to the second side of the valve assembly. Accordingly, when the pressure exerted on the first side of the valve assembly exceeds a predetermined pressure differential with respect to the second side of the valve assembly, the second component moves with respect to the first component to allow fluid to flow through the valve assembly, thus dissipating a shock in the hydraulic device in which the valve assembly is disposed.

According to one aspect of the present disclosure, a shock valve assembly is provided for a hydraulic system. More particularly, in accordance with this aspect, the shock valve assembly includes a fluid path extending between a first port and a second port with a shock valve disposed in the fluid path to normally block fluid flow through the fluid path between the first and second ports. The shock valve temporarily opens to permit fluid flow between the first port and the second port through the fluid path when a fluid pressure differential between the ports exceeds a predetermined threshold. Fluid flow occurs in a first direction from the first port to the second port through the fluid path when the shock valve is temporarily opened and fluid pressure in the first port is greater than the second port. Fluid flow occurs in a second, reverse direction through the fluid path from the second port to the first port when the shock valve is temporarily opened and fluid pressure in the second port is greater than the first port.

The shock valve can include at least one valve plug portion that is urged toward a first seat portion to normally block fluid communication from the first port to the second port when the fluid pressure in the first port is greater than the second port. The at least one valve plug portion can also be urged toward a second seat portion to normally block fluid communication from the second port to the first port when the fluid pressure in the second port is greater than the first port. The first and second seat portions can be spaced apart from one another in the fluid flow path. An auxiliary fluid passage can optionally fluidly connect to the fluid passage at a location between the first and second seat portions and further fluidly connect to an auxiliary hydraulic device or component.

According to another aspect, a valve assembly for a hydraulic system is provided. More particularly, in accordance with this aspect, the valve assembly includes a fluid path extending between a first port and a second port with a valve disposed in the fluid path to block fluid flow through the fluid path between the first and second ports. The valve includes at least one valve plug portion urged toward a first seat portion to block fluid communication from the first port to the second port when the fluid pressure in the first port is greater than the second port. The at least one valve plug portion is urged toward a second seat portion to block fluid communication from the second port to the first port when the fluid pressure in the second port is greater than the first port. The first and second seat portions are spaced apart from one another in the fluid path. An auxiliary fluid passage is fluidly connected to the fluid passage at a location between the first and second seat portions and further fluidly connects to an auxiliary hydraulic device or component.

According to yet another aspect, a hydraulic motor having a shock absorbing valve assembly is provided. More particularly, in accordance with this aspect, the hydraulic motor having a shock absorbing valve assembly includes a rotor set operatively coupled to a drive shaft and a housing having a central opening in which at least one of the rotor set or the drive shaft is at least partially received. A first port and a second port are defined in the housing and each is fluidly connected to the central opening such that hydraulic fluid entering into one of the first and second ports normally passes through the central opening by the rotor set and the drive shaft and exits out the other of the first and second ports. A short-circuit fluid passage is fluidly connected directly to the first port and the second port for selectively passing hydraulic fluid directly between the ports to absorb pressure shocks. A bi-directional valve assembly is disposed within the fluid passage for selectively allowing fluid communication from the first port to the second port when the motor is operating in a first direction and selectively allowing fluid communication from the second port to the first port when the motor is operating in a second, reverse direction. Selective allowance of fluid communication between the first and second ports through the bi-directional valve occurs when a pressure differential between the first and second ports exceeds a predetermined threshold and until the pressure differential is below the predetermined threshold.

According to still another aspect, a pressure shock absorbing hydraulic transmission system having a hydraulic motor driven by a pump is provided. More particularly, in accordance with this aspect, the transmission system having a hydraulic motor driven by a pump includes a motor housing having first and second ports fluidly connected to a hydraulic pump. The motor housing defines a central cavity in which a combination rotor set and drive shaft is disposed. The first and second ports are fluidly connected to the central cavity for directing hydraulic fluid from the hydraulic pump through the central cavity with the combination rotor set and drive shaft. When the hydraulic fluid is pumped in a first direction into the first port, the hydraulic fluid normally enters the central cavity with the combination rotor set and drive shaft from the first port and exits through the second port. When the hydraulic fluid is pumped in a second direction into the second port, the hydraulic fluid normally enters the central cavity with the combination rotor set and drive shaft from the second port and exits through the first port. A bi-directional shock valve is disposed within a short-circuit path extending directly between the first port and the second port. The shock valve prevents fluid communication through the short-circuit fluid path when a pressure differential between the first port and the second port is below a predetermined threshold. The shock valve opens to allow fluid communication from the first port to the second port when the hydraulic fluid is pumped in the first direction and the pressure differential reaches the predetermined threshold, and also opens to allow fluid communication from the second port to the first port when the hydraulic fluid is pumped in the second direction and the pressure differential reaches the predetermined threshold, to accommodate pressure spikes from either direction between the first and second ports.

DETAILED DESCRIPTION

With reference to FIGS. 1A, 1B and 3-4, a shock valve assembly 10 for a hydraulic system is depicted in the housing of a hydraulic device 12, which can include a hydraulic gerotor assembly (acting as a motor or a pump), a hydraulic pump, a manifold, etc. In an alternate configuration, the valve assembly 10 can be disposed externally to the housing of the device 12, for example in a retrofit application. The illustrated hydraulic device 12 includes a first port A (depicted schematically) and a second port B (depicted schematically), Whether port A or B is acting as a pressure port or a return port is a function of the direction of the fluid flowing through the respective port. For example, when fluid enters port A, then that port functions as a pressure or inlet port and the other port, port B, functions as a return or outlet port. Alternatively, when fluid enters port B, that port functions as the pressure or inlet port and the other port, port A, functions as the return or outlet port. In either arrangement, the valve assembly 10 includes a shock valve 16 disposed in a fluid path 14 extending between the fluid ports A and B. If the valve assembly 10 were not present in the depicted device, a short circuit would exist between the ports A and B. The fluid path 14, alternately referred to herein as a short-circuit fluid path, is fluidly connected directly to the ports A, B for selectively passing hydraulic fluid directly between the ports to absorb pressure shocks.

More particularly, the shock valve 16 is disposed in the fluid path 14 to normally block fluid flow through the fluid path 14 between the first and second ports A, B. As will be described in more detail below, the shock valve 16 temporarily opens to permit fluid flow between the first port A and the second port B through the fluid path 14 when a fluid pressure differential between the ports exceeds a predetermined threshold T. Fluid flow occurs in a first direction from the first port A to the second port B through the fluid path 14 when the shock valve 16 is temporarily opened and fluid pressure in the first port A is greater than the second port B. Fluid flow occurs in a second, reverse direction through the fluid path 14 from the second port B to the first port A when the shock valve 16 is temporarily opened and fluid pressure in the second port B is greater than in the first port A.

Figure 6:
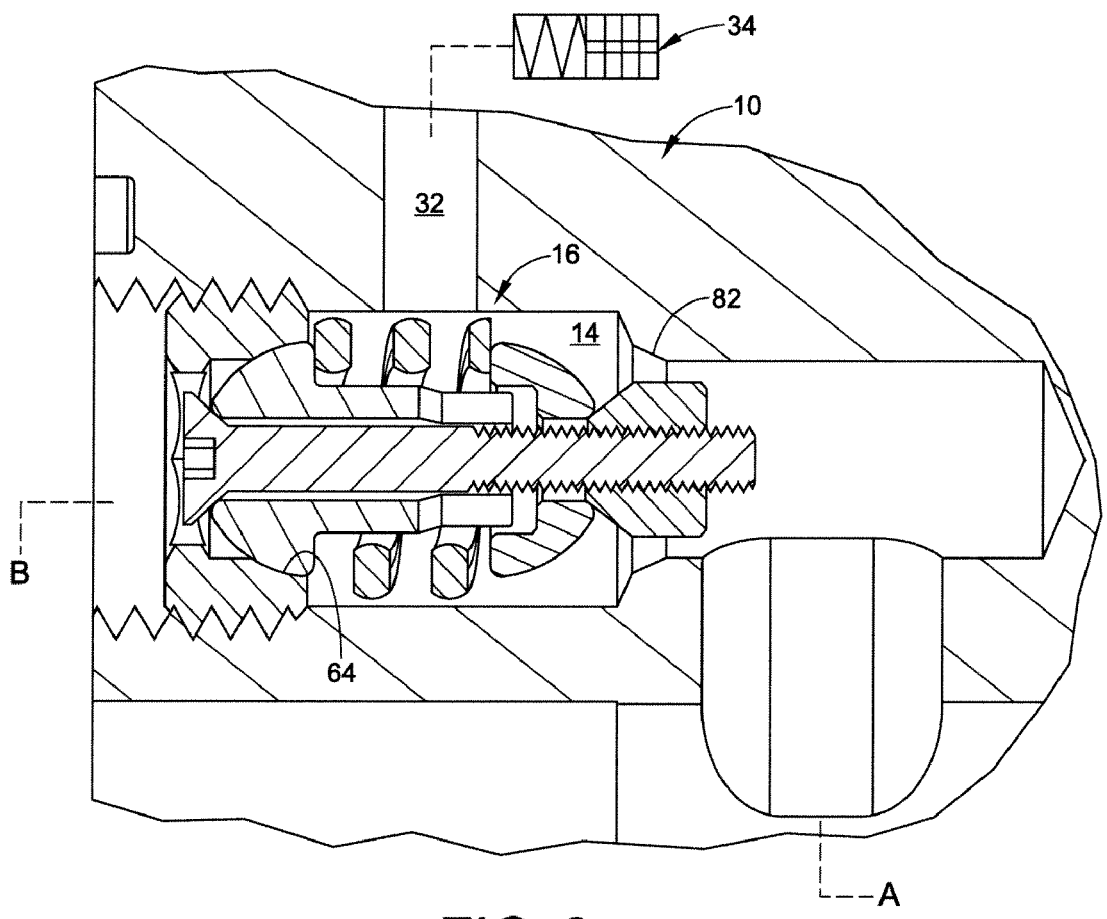
FIG. 6 is a view similar to FIG. 1A depicting an additional passage in the hydraulic device for providing pressure to another hydraulic device, e.g. an external hydraulic brake, or to a portion of the same hydraulic device, e.g. an integrated hydraulic brake.

Thus, the valve assembly 10 and its valve 16 in the depicted embodiment are bi-directional in that they can allow fluid to pass in either direction, e.g. from port A toward port B and from port B toward port A, when a predetermined pressure differential is exhibited across the valve assembly (i.e., when the pressure differential between the ports A and B exceeds the predetermined threshold T). In other words, the valve 16 is in a generally closed state when the pressure differential is less than the predetermined threshold T. As more clearly seen in FIG. 6, the valve assembly 10 can also be described as a shuttle-type valve in that it can move between respective seats, which will be described in more detail below, while allowing fluid to pass into an auxiliary fluid passage 32 that can be in fluid communication with another hydraulic device, e.g. an external hydraulic brake, or to a portion of the same hydraulic device, e.g. an integrated hydraulic brake (both generally depicted schematically at reference character 34). In particular, as shown, the auxiliary fluid passage 32 can fluidly connect to the fluid passage 14 at a location between the first and second valve seats 20, 26 to the device 34. Alternatively, the valve 16 of FIG. 6 could be replaced by a ball and thereby operate as a simple shuttle valve (i.e., the ball could shuttle between the valve seat surfaces 64,82 depending on whether fluid pressure was greater at port A or port B).

Returning to FIG. 1A, the shock valve 16 of the illustrated embodiment includes at least one valve plug portion urged toward a first seat or seat portion 20 to normally block fluid communication from the first port A to the second port B when the fluid pressure in the first port A is greater than the second port B. The at least one valve plug portion is urged toward a second seat or seat portion 26 to normally block fluid communication from the second port B to the first port A when the fluid pressure in the second port B is greater than the first port A. As shown, the first and second seat portions 20, 26 are spaced apart from one another in the fluid flow path 14.

In the illustrated embodiment, the at least one valve plug portion includes a first poppet 22 and a second poppet 24. The first poppet 22 has a first poppet head portion 22a which seats against the first seat 20 when fluid pressure in the first port A is greater than in the second port B. Similarly, the second poppet 24 has a second poppet head portion 24a which seats against the second seat 26 when fluid pressure in the second port B is greater than in the first port A. As will be described in more detail below, the head portions 22a, 24a are movable relative to one another when the valve 16 temporarily opens to absorb pressure shocks. In the illustrated embodiment, the at least one valve plug portion, and specifically the first poppet 22, includes a stem portion 22b extending between and maintaining a minimum spacing between the head portions 22a, 24a. A biasing member, such as a spring 28, is annularly received about the stem portion 22b to urge the head portions 22a, 24a to at least a specific spaced apart distance from one another, such as the spaced apart distance shown in FIG. 1A.

The valve seat 20 in the depicted embodiment includes external threads 40 that threadedly engage internal threads 42 formed in a portion of the passage 14 in the hydraulic device 12. Alternatively, the valve seat 20 can engage the hydraulic device 12 in other manners, such as via a press-in fit. In such an instance, the valve seat 20 may not be threaded. The valve seat 20 also includes a central opening 44 having a hexagonal configuration 46 throughout a portion thereof to facilitate insertion of the valve seat 20 and the assembly 10 into the passage 14. The central opening 44 acts as an inlet or an outlet for the valve assembly 10 depending on the direction of flow through the assembly. The valve seat 20 also includes a rounded sealing surface 48 surrounding the central opening 44 that cooperates with the first poppet 22 in a manner that will be described in more detail below.

Although the depicted embodiment shows the first poppet 22 including a head portion 22a and a stem portion 24a, a poppet, similar in shape to the second poppet 24, can be located where the head portion 22a of the first poppet 22 is located and a separate stem, similar in shape to the stem portion 22b, can be located between the poppets 22, 24 in an alternate arrangement. In either configuration, the stem precludes the spring 28 from bottoming out and allowing fluid to provide pressure to a back side (right side per FIG. 1A) of the poppet 22.

With reference back to the depicted embodiment, the head portion 22a includes a rounded contact surface 64 that seats against the rounded sealing surface 48 of the valve seat 20 when the pressure is greater in port A (at the right side of the illustrated valve assembly 10) as compared to in port B (the left side of the illustrated valve assembly). The contact surface 64 and the sealing surface 48 can take other configurations, for example conical. The at least one valve plug portion, including the head portions 22a, 24a and the stem 22b, includes a shock fluid passage 66 defined therethrough. As will be described in more detail below, fluid communication between the parts A, B occurs through the passage 66 when the fluid pressure differential between the parts A, B exceeds the predetermined threshold T.

A shock fluid passage closure member 68 is received in the shock fluid passage 66 for blocking fluid communication therethrough except when the pressure differential between the ports A, B exceeds the predetermined threshold T. More particularly, the closure member 68 includes a first head portion 68a disposed adjacent one end of the passage 66 for blocking fluid passage thereby when seated against the first poppet head portion 22a. More specifically, the first poppet 22 includes an additional contact surface 70, which can be coextensive with the rounded contact surface 64, that contacts the closure member 68 in a manner that will be described in more detail below. As shown, the passage 66 can be formed of an axial opening 66a that extends through the poppet 22 and at least one radial opening 66b that extends radially outwardly from and communicates with the axial opening 66a. The axial opening 66a acts as a fluid outlet for the valve assembly 10 when the pressure on the right side of the valve assembly (i.e., at port A) exceeds the biasing force or urging of the biasing member 28. The first poppet 22 also includes a second contact surface 72, which in the depicted embodiment is generally planar and normal to the central axis of the first poppet.

The closure member 68 further includes a second head portion 68b adjacent another end of the shock fluid passage 66 for blocking fluid passage thereby when seated against the second poppet head portion 24a. A stem portion 68c, which is received in the shock fluid passage 66, extends between and connects the first and second head portions 68a, 68b. In the illustrated embodiment, the first head portion 68a and the stem portion 68c are together formed as a fastener having a threaded region 68d located on the stem portion 68c. The second head portion 68b is formed as a threaded member threadedly received on the threaded region 68d. As shown, the fastener 68a, 68c attaches the first poppet to the second poppet 24.

As will be described in further detail below, the first head portion 68a is movable apart from the first poppet head portion 22a by causing the second head portion 68b to move the second poppet head portions 24a toward the first poppet head portion 22a by overcoming the urging of the biasing member 28 when the fluid pressure in the first port A is greater than the second port B such that the fluid pressure differential between the ports A, B exceeds the predetermined threshold T. Similarly, the second head portion 68b is movable apart from the second poppet head portion 24a by causing the first head portion 68a to move the first poppet head portion 22a toward the second poppet head portion 24a by overcoming urging of the biasing member 28 when fluid pressure in the second port B is greater than the first port A such that the fluid pressure differential between the parts A, B exceeds the predetermined threshold T.

Spacing between the first and second closure member head portions 68a, 68b defines a maximum amount of spacing between the first and second poppet members 22, 24 (specifically, between the first and second poppet member head portions 22a, 24a). Due to the arrangement of the closure member 68 being a fastener 68a, 68c threadedly engaged to the threaded member 68b, the spacing between the first and second head portions 68a, 68b is adjustable by moving the threaded member 68b along the threaded region 68d of the stem portion 68c. Such movement can be used to adjust the maximum amount of spacing between the first and second poppet members 22, 24. In that regard, a hexagonal opening or similar, such as opening 68e, can be formed in the head portion 68a to facilitate tightening of the fastener.

Figure 1A:
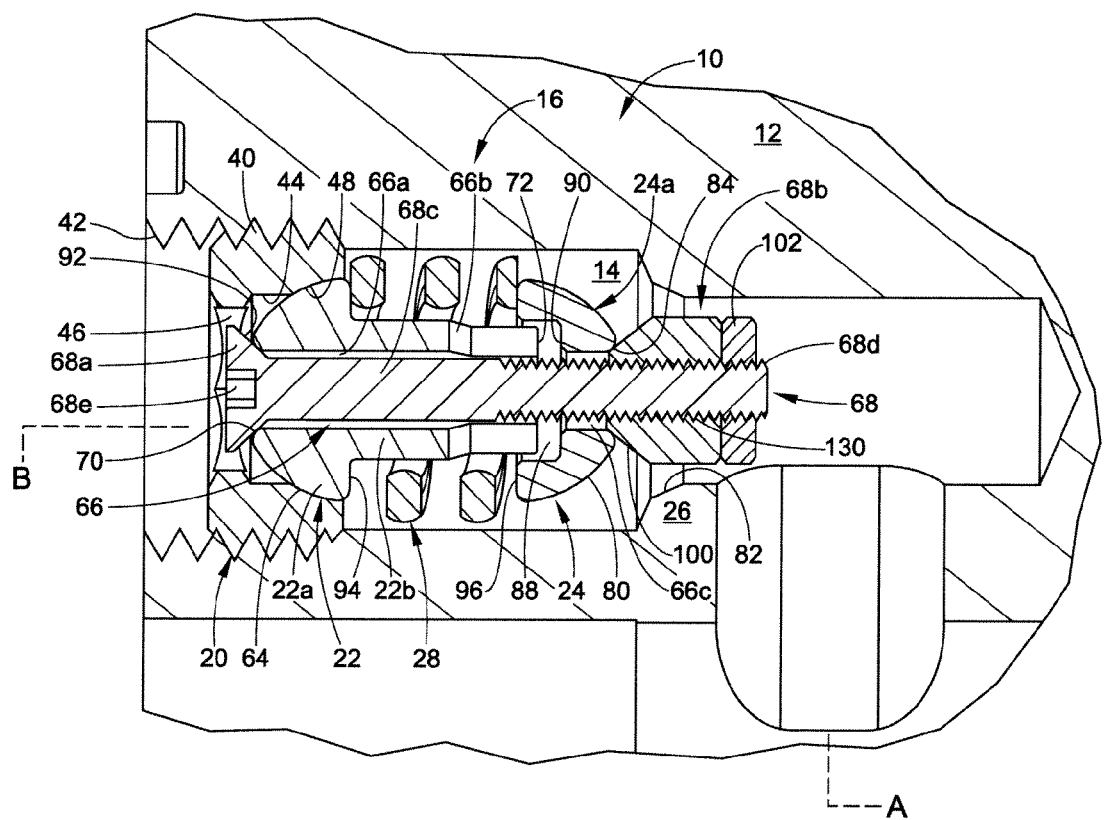
FIG. 1A is a cross-sectional view of a shock valve assembly disposed in a hydraulic device including a shock valve shown in a closed state to block fluid flow thereby.

As illustrated, the second poppet 24 includes a rounded contact surface 80 that seats against a sealing surface 82 of the second seat portion 26 formed in the passage 14 when the pressure is greater at the left side of the valve assembly 10 (port B) as compared to the right side of the valve assembly (port A, per the orientation depicted in FIG. 1A). If desired, the assembly 10 can be provided in a sleeve or housing that can include a sealing surface similar to the second seat portion 26 formed in the passage 14. The sleeve can house the aforementioned components of the valve assembly 10 and press into the passage 14 in the housing of the device 12.

The second poppet 24 also includes an additional contact surface 84, which can be coextensive with the first contact surface 80, that contacts the retaining member 68b in a manner that will described in more detail below. The second poppet 24 also has a portion of the shock fluid passage 66 defined therethrough. In particular, the passage 66 through the second poppet 24 includes an axial opening 66c that generally aligns with the axial opening 66a of the first poppet 22 when the valve assembly 10 is finally assembled. The axial opening 66c of the second poppet 24 acts as a fluid outlet for the valve assembly 10 when the fluid pressure to the left of the valve assembly (port B) exceeds the biasing force of the biasing member 28. The second poppet 24 also includes a counterbore 88 coaxial with and in communication with the central opening 66c. The counterbore 88 ends at a second contact surface 90 that in the depicted embodiment is generally planar and normal to the central axis of the second poppet. The counterbore 88 is configured to receive a distal portion of the stem portion 22b of the first poppet 22, which is partially defined by the second contact surface 72. The counterbore 88 has a depth measured parallel to a central axis of the assembly 10 so that, if desired, the planar contact surface 72 of the first poppet 22 is spaced from the planar contact surface 90 of the second poppet 24.

As shown, the head 68a of the fastener 68a, 68c includes a conical sealing surface 92 that contacts the additional contact surface 70 of the head portion 22a of the first poppet 22. The shank 68c of the fastener 68a, 68c is received inside the axial opening 66a of the first, poppet 22 and the axial opening 66c and counterbore 88 of the second poppet 24. The biasing member 28, which in the depicted embodiment is a spring, surrounds the stem portion 22b of the first poppet 22. The spring 28 contacts a spring contact surface 94 of the first poppet 22 and a spring contact surface 96 of the second poppet 24, biasing the poppets away from one another.

The retaining member 68b, which in the depicted embodiment is a nut, includes a threaded opening 98 that receives the threaded portion 68d of the fastener 68a, 68c. The nut 68b fixes the location of the first poppet 22 in relation to the second poppet 24 when there is no external force acting on the spring 28. The nut 68b also includes a conical sealing surface 100 that contacts the additional contact surface 84 of the second poppet 24 in a manner that will be described in more detail below. An additional lock nut 102 can be placed on the right side (per the orientation of FIG. 1A) of the nut 68b to eliminate undesired untightening or turning of the nut or a suitable thread retaining compound or device may be used to perform the same effect.

Figure 1B:
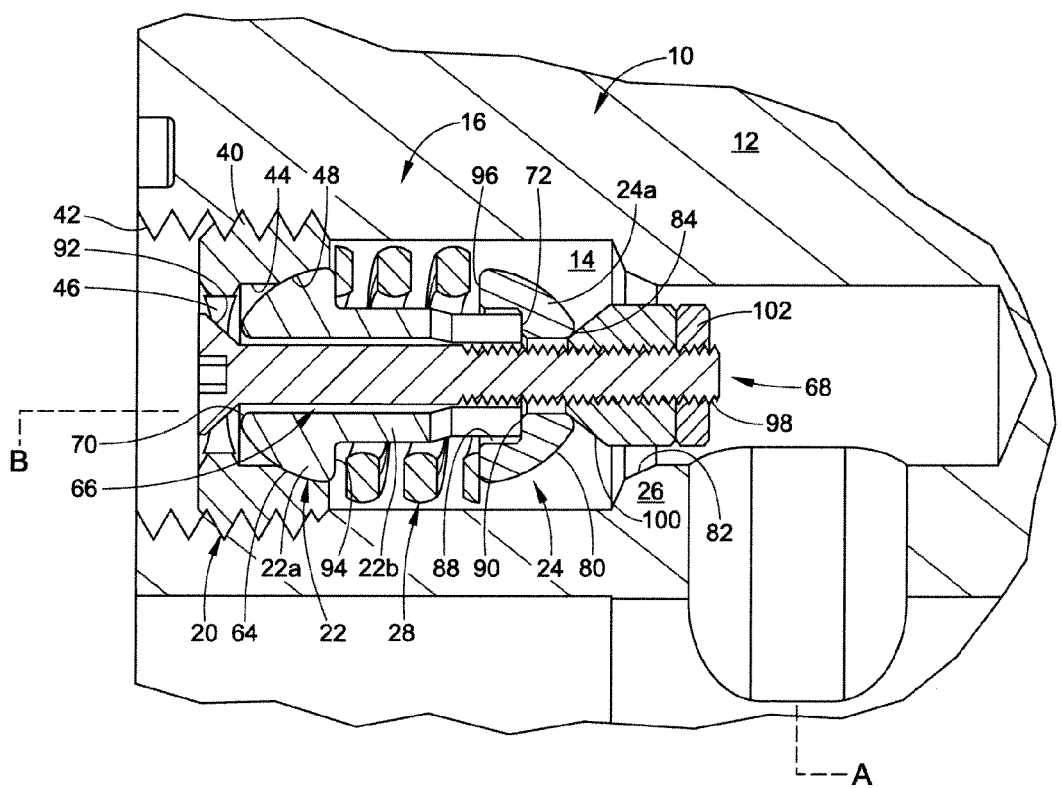
FIG. 1B is a cross-sectional view of the shock valve assembly of FIG. 1A showing the shock valve in a temporarily opened state to absorb a pressure shock.

In operation, if fluid pressure is greater in port A than port B (the right side of the valve assembly 10 as compared to the left side per the orientation of FIG. 1A), then the contact surface 64 of the first poppet 22 seats against the sealing surface 48 of the first valve seat 20 to block flow through the valve seat from right to left. When the first poppet 22 is seated on the valve seat 20, fluid travels around the nut 68b and the second poppet 24, through the spring 28 into the radial opening 66b and the axial opening 66a, which is not completely filled by the shank 68c of the fastener. If a pressure spike is experienced on the port A side (on the right side of the head 68a that overcomes the biasing force of the spring 28), then the fastener 68a, 68c moves to the left (as shown in FIG. 1B) so that the sealing surface 92 of the fastener unseats from the additional contact surface 70 of the first poppet 22. During the pressure spike, the first poppet 22 is still retained by the valve seat 20 since it is fixed in the passage 14 and fluid escapes through the central opening 44 of the valve seat.

If fluid pressure is greater at port B (on the left side of the valve assembly 10, as compared to the right side per the orientation of FIG. 1A), then the contact surface 80 of the second poppet 24 seats against the sealing surface 82 of the passage 14 (or sleeve if one is used) to block flow through the second valve seat 26, which in this case is the machined surface in the passage 14, from left to right. When the second poppet 24 is seated on the contact surface 82 of the passage 14, fluid travels around the first poppet 22, through the spring 28 into the radial opening 66b and the counterbore 88, which is not completely filled by the shank 68c of the fastener. If a pressure spike is experienced on the left side of the valve assembly 10 that overcomes the biasing force of the spring 28 (per the orientation of FIG. 1A), then the fastener 68a,68c moves to the right so that the sealing surface 100 of the nut 68b unseats from the additional contact surface 84 of the second poppet 24. During the pressure spike, the second poppet 24 is still retained by the contact surface 82 machined into the passage 14 and fluid escapes through the central opening 66c of the second poppet.

As opposed to known relief and/or shock valves used with hydraulic devices, the depicted valve assembly 10 can be adjusted so that it dumps flow, e.g. opens, in response to different predetermined pressures or pressure differential thresholds. For example, the fastener 68a, 68c can be tightened or loosened in the nut 68b so that a desired biasing force is exerted by the spring 28 on the poppets 22 and 24. Alternatively, the closure member 68 could be assembled and/or manufactured differently (e.g., robot assembled). In such a case, the member 68b could be attached to the member 68a, 68c by any known means, including those other than the illustrated threaded connection (e.g., press fit, tack welded, friction welded, etc.).

Figure 7:
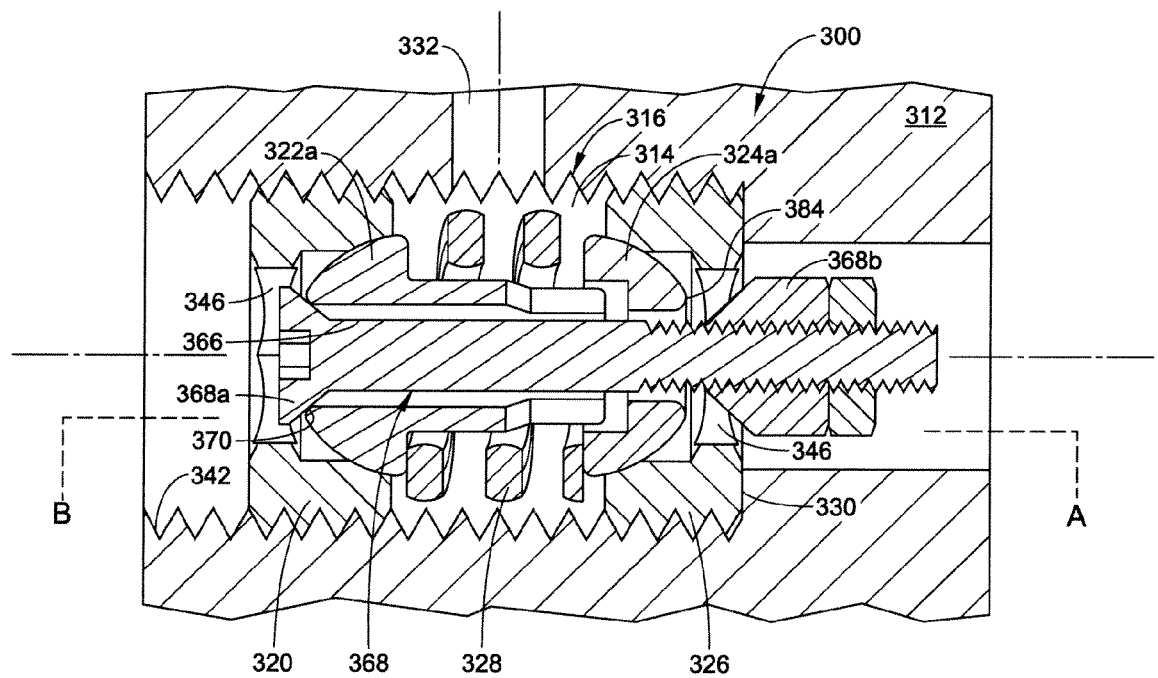
FIG. 7 is a cross-sectional view of an alternate shock valve assembly disposed in a hydraulic device.

With reference to FIG. 7, a shock valve assembly 300 for a hydraulic system is depicted in the housing of a hydraulic device 312. Except as described hereinbelow, the shock valve assembly 300 is the same or similar to the shock valve assembly 10 already described. The device 312 includes a first port A and a second port B (both ports depicted schematically). The ports A,B of the device 312 function as described in reference to the device 12. The valve assembly 300 includes a shock valve 316 disposed in a fluid path 314 extending between the ports A,B. Like the valve 16, the valve 316 can be bi-directional and can allow fluid to pass thereby when a predetermined pressure differential is exhibited across the valve assembly 300 (i.e., when the pressure differential between ports A and B exceeds the predetermined threshold T).

The valve 316 includes a first seat or seat portion 320 and a second seat or seat portion 326. As shown, the seat portions 320,326 can be separate components threaded along internal threads 342 extending along the path 314. Unlike the illustrated second seat portion 26 of FIG. 1A, the seat portion 326 is depicted as being a separate component threaded along internal threads 342. More particularly, the second seat 326 can be threadedly installed along the path 314 until the seat 326 bottoms out against shoulder 330 defined along the path 314 in the device 312. As shown, auxiliary fluid passage 332 fluidly connects to the path 314 at a location generally between the first and second valve seats 320,326 and can operate like the fluid passage 32 illustrated in and described in reference to FIG. 6. Both of the first and second seats 320,326 can include hexagonal configurations 346 which facilitate threaded insertion of the valve seats 320,326 within the path 314 along threads 342.

While the valve 316 absorbs pressure shocks in the same manner as described in reference to the valve 16, the operation is slightly different than described in reference to valve 16. More particularly, in the valve 316, the closure member 68 operates to shuttle back and forth depending on whether fluid pressure is greater at port A or port B. More particularly, closure member 368 will be urged to the right in FIG. 7 when fluid pressure is greater in port B than port A causing first head portion 368a to seat against contact surface 370. When fluid pressure is greater in port A than port B, second head portion 368b will move generally to the left in FIG. 7 to seal against contact surface 384.

For absorbing pressure shocks, poppet head portions 322a, 324a respectively overcome the urging force of spring 328. Accordingly, in FIG. 7 with the fluid pressure at port B exceeding that at port A, a pressure shock wherein the pressure differential between port B and port A exceeds a predetermined threshold will cause the first poppet head 322a to overcome the urging of the spring 328 such that fluid flow can occur between the seat 320 and the head 322a, and more particularly occur from port B to one or both of the auxiliary passage 332 and port A.

Figure 8:
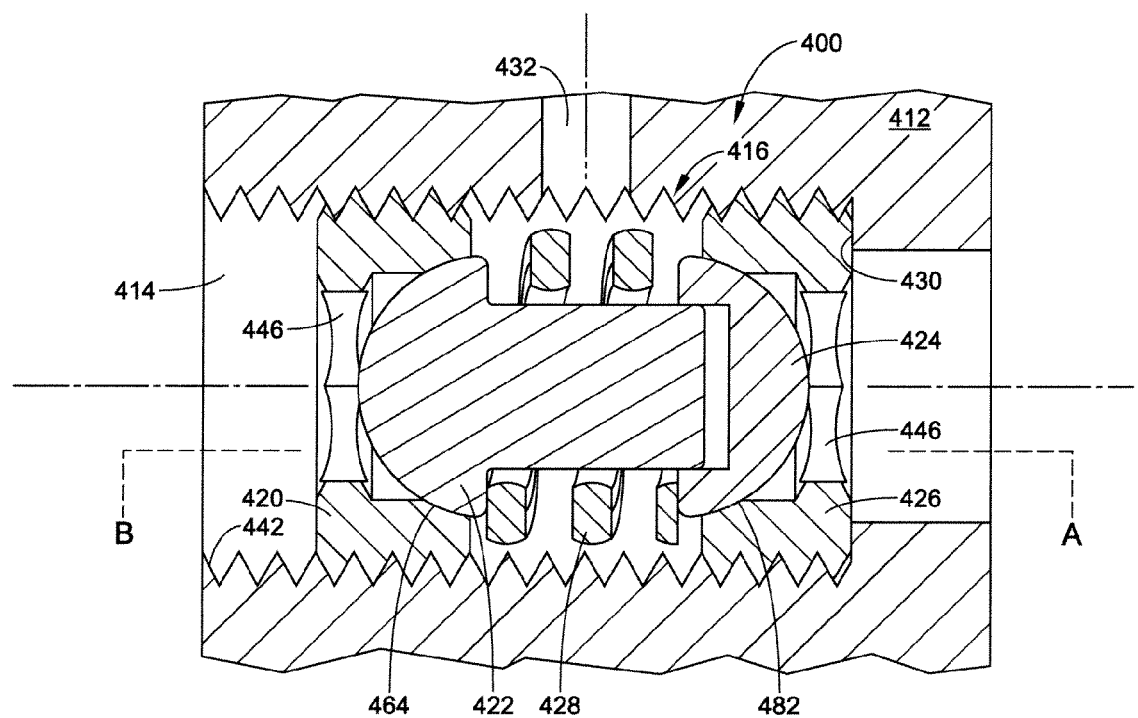
FIG. 8 is a cross-sectional view of another alternate shock valve assembly disposed in a hydraulic device.

With reference to FIG. 8, another valve assembly 400 is illustrated including a valve 416 disposed along fluid path 414 defined between ports A and B within the housing of device 412. Like the valve assembly 300 of FIG. 7, the valve assembly 400 includes a first seat 420 and a second seat 426, both threadedly installed within the fluid path 414 along threads 442. The second seat 426 is particularly installed until it bottoms out against shoulder 430. Both of the seats 420,426 can include hexagonal configurations 446 for facilitating threaded installation into the device 412.

Except as described herein, the valve assembly 400 operates the same or similar to the valve assembly 300. One difference between the valve assembly 400 and the valve assembly 300 is the elimination of the closure member 368 and passage 366 in which the closure member 368 is received. In addition, the valve 416 includes a first poppet 422 like the first poppet 22 but without the shock fluid passage or passages 66 being defined therethrough. The valve 416 further includes a second poppet 424 like the second poppet 24 but without the shock passage or passages 66 being defined therethrough. As illustrated, the poppets 422,424 are normally seated against valve seat surfaces 464 and 482, respectively. When the fluid pressure at one of the ports A or B is sufficient to overcome spring 428, a respective one of the poppets 422,424 overcomes the urging of the spring 428 to permit fluid communication between the appropriate port A or B and auxiliary passage 432. More particularly, if the fluid pressure differential between ports A and B exceeds a predetermined threshold, the port A or B at which the pressure is higher will urge the appropriate poppet 422 or 424 to overcome the spring 428. The auxiliary passage 432 can be an internal or external drain operating to absorb fluid shock pressure when one of the ports A,B fluidly communicates therewith.

Figure 9:
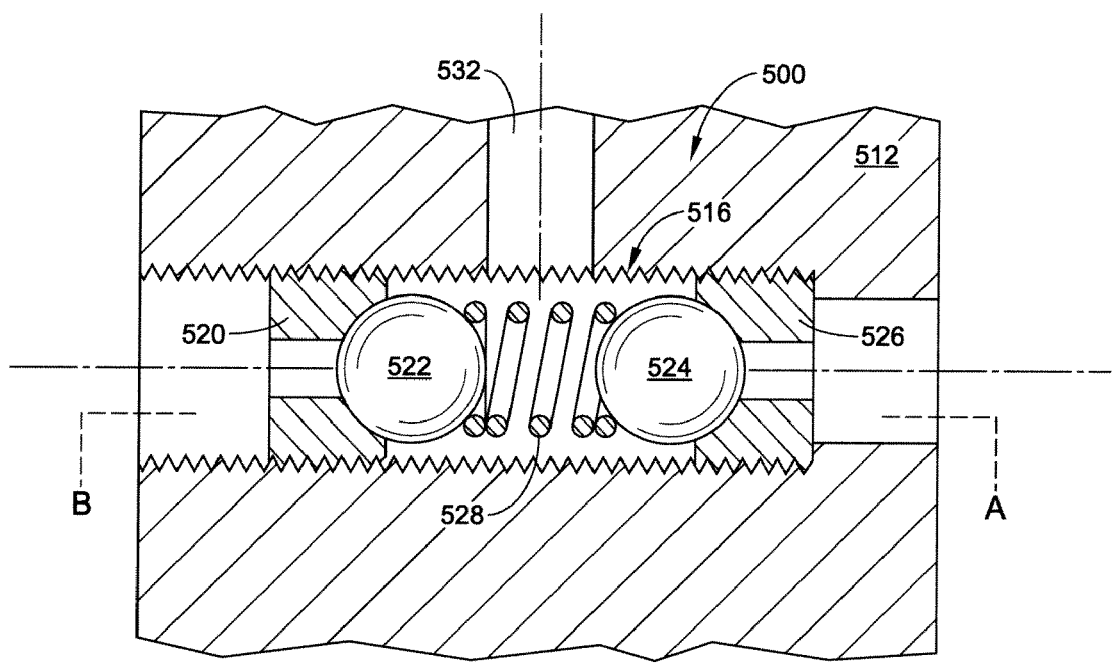
FIG. 9 is a cross-sectional view of still another alternate shock valve assembly disposed in a hydraulic device.

With reference to FIG. 9, yet another valve assembly 500 is shown including a valve 516 defined in the housing of a device 512. Except as described herein, the valve assembly 500 and its valve 516 operate and function as described in reference to the valve assembly 400 and valve 416. Instead of poppets 422,424, the valve 516 includes first and second balls or ball valves 522,524 which are normally seated against respective valve seats 520 and 526 (which can be the same as the valve seats 420,426, though in FIG. 9 the valve seats 520,526 are not shown with hexagonal configurations 446). The ball valves 522,524 of FIG. 9 and the poppets 422,424 can alternately be referred to herein as first and second valve members. In FIG. 9, when the fluid pressure at one of ports A or B exceeds the predetermined threshold T, the appropriate valve member or ball valve 522 or 524 can overcome the urging of the spring 528 to move the respective ball valve 522 or 524 off its valve seat 520 or 526 such that fluid communication can be established between the appropriate port A or B and auxiliary passage 532. Like passage 432 of FIG. 8, the auxiliary passage 532 can be an internal or external drain operating to absorb fluid shock pressure when one of the ports A,B fluidly communicates therewith.

Figure 2:
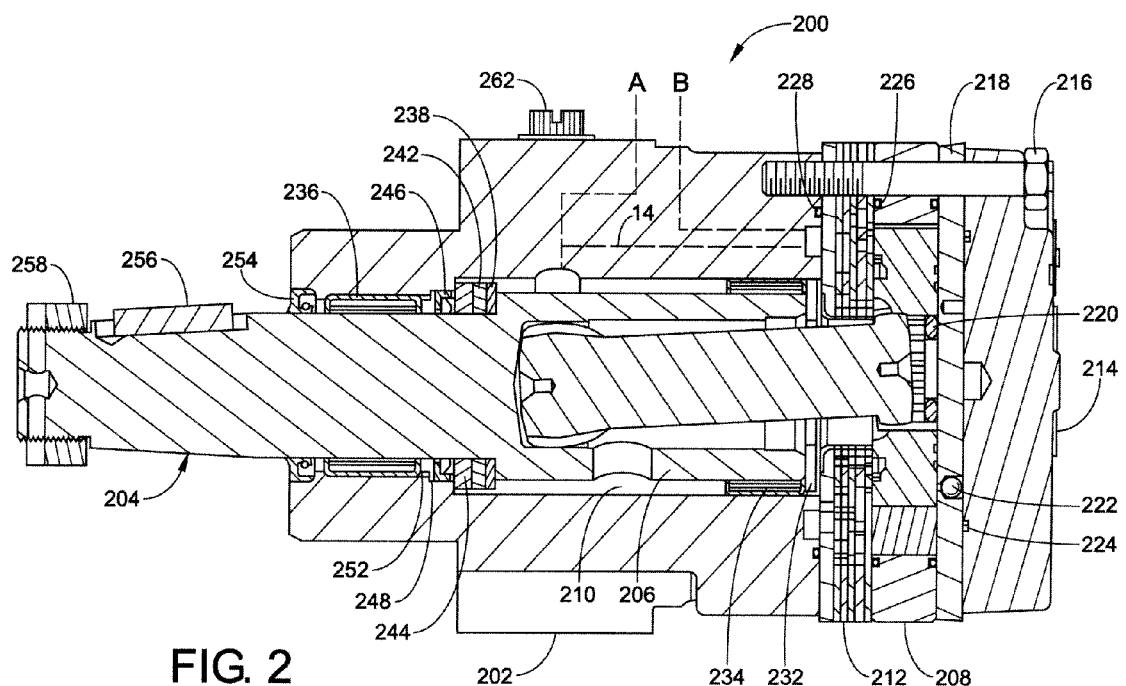
FIG. 2 is a cross-sectional view of a hydraulic motor, which can also act as a pump depending on the direction of fluid flow.
Figure 3:
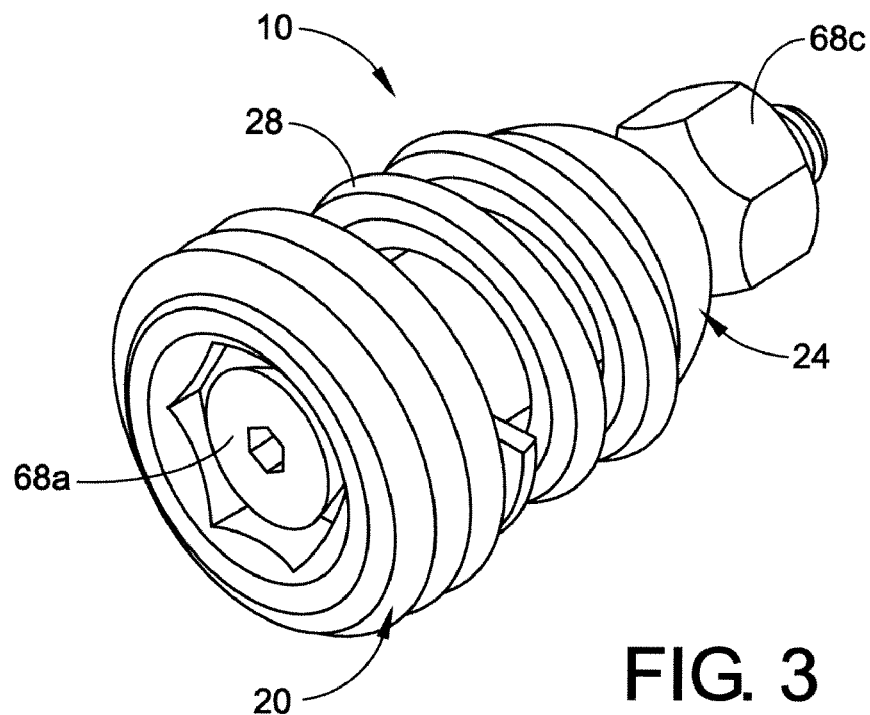
FIG. 3 is a perspective view of the shock valve assembly of FIG. 1.
Figure 4:
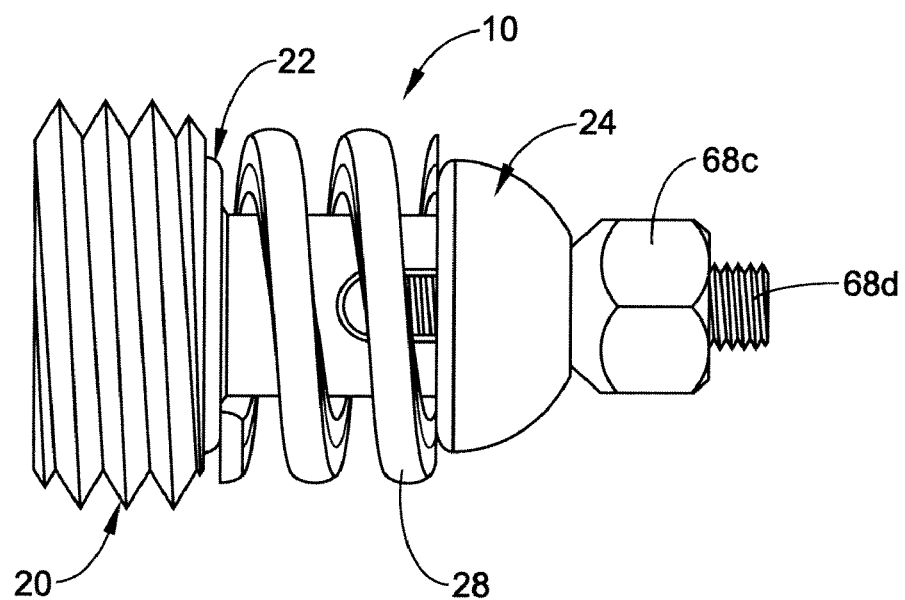
FIG. 4 is an elevation view of the shock valve assembly of FIG. 1.

A more particular example of a hydraulic device that the valve assembly 10 can be incorporated into is shown at FIG. 2. Particularly, FIG. 2 depicts a hydraulic motor 200, which can also operate as a pump, that has been adapted from a hydraulic motor that is known to one skilled in the art. Fluid passage 14 (depicted schematically) has been added to the motor, which serves a similar purpose to the fluid passage 14 shown in FIG. 1A. More specifically, the motor 200 depicted in FIG. 2 includes a housing 202 in which the schematically shown ports A, B can be defined and fluid passage 14 would be defined between the ports A, B in the motor housing 202. The valve assembly 10 (FIGS. 1A, 1B, 3 and 4) could be disposed along the fluid path 14 between ports A and B such that the shock valve 16 could be disposed entirely within the housing 202. The motor 200 further includes a shaft 204 and a drive link 206 connected to the shaft at one end of the drive link. The opposite end of the drive link 206 connects to an orbiting and rotating rotor of a gerotor set 208, which also includes a stator. Thus, the gerotor set 208 is operatively coupled to the drive shaft 204 via the drive link 206. The housing 202 has a central opening 210 in which at least one of the drive shaft 204, the drive link 206 and the gerotor set 208 is at least partially received. As shown, the ports A, B are each fluidly connected to the central opening 210. A manifold 212 is positioned between the housing 202 and the rotor set 208. An end cover 214 fastens to the housing 202 using bolts 216 (only one depicted). A balancing plate 218 having a check ball 222 disposed in a passage is positioned between the end cover 214 and the rotor set 208. A drive link spacer 220 separates the drive link 206 from the balancing plate 218.

A first seal 224 is provided between the balancing plate 218 and the end cover 214. A second seal 226 is provided between the rotor set 208 and the manifold 212. A third seal 228 is provided between the manifold 212 and the housing 202. A thrust bearing 232 surrounds the drive link and is positioned between an end of the shaft 206 and the manifold 212. A first shaft bearing 234 surrounds an inner end of the shaft 206 and a second shaft bearing 236 surrounds the shaft near where the shaft extends from the housing 202.

From right to left (per the orientation depicted in FIG. 2), a first thrust washer 238, a thrust bearing 242 and a second thrust washer 244 surround the shaft 204. A shaft seal 246, a backup 248 and a seal backup ring 252 also surround the shaft 204. A dust seal 254 surrounds the shaft 204 where it exits the housing 202. A key 256 and a hex nut 258 attach near a distal end of the shaft 204. A cap plug 262 is also shown.

The general flow of hydraulic fluid through the motor 200 is known to those skilled in the art. In particular, the motor 200 and its housing 202 are arranged such that hydraulic fluid entering one of the ports A or B normally passes through the central opening 210 by the gerotor set 208 and the drive shaft and link 204, 206 and exits at the other of the ports A or B. When operating as a motor, the central opening 210 in the center of the housing 202 is pressurized via port A and port B operates as a return. As stated earlier, if the valve assembly 10 (FIG. 1A) is not positioned within the passage 14, a direct short between port A and port B would exist. If the shaft 204 suddenly stops rotating, e.g. from suddenly contacting an obstruction, while pressure is being delivered to port A, the valve assembly 10 (FIG. 1A) would open, e.g. the fastener 68a, 68c would move to the left (per the orientation of FIG. 1A), thus allowing fluid to flow directly to the return port B, as opposed to traveling through the rotor set 208, as well as other components, of the motor.

Though the motor 200 of FIG. 2 is shown and described as having its central opening 210 pressurized, it is to be appreciated by those skilled in the art that the valve assembly 10 (and its valve 16) will work in all different types of motors, including those that do not pressurize their central openings. For example, the shock valve 16 could be disposed in an end cover of a three pressure zone type motor (i.e., a motor that does not include a pressurized central opening).

Figure 5:
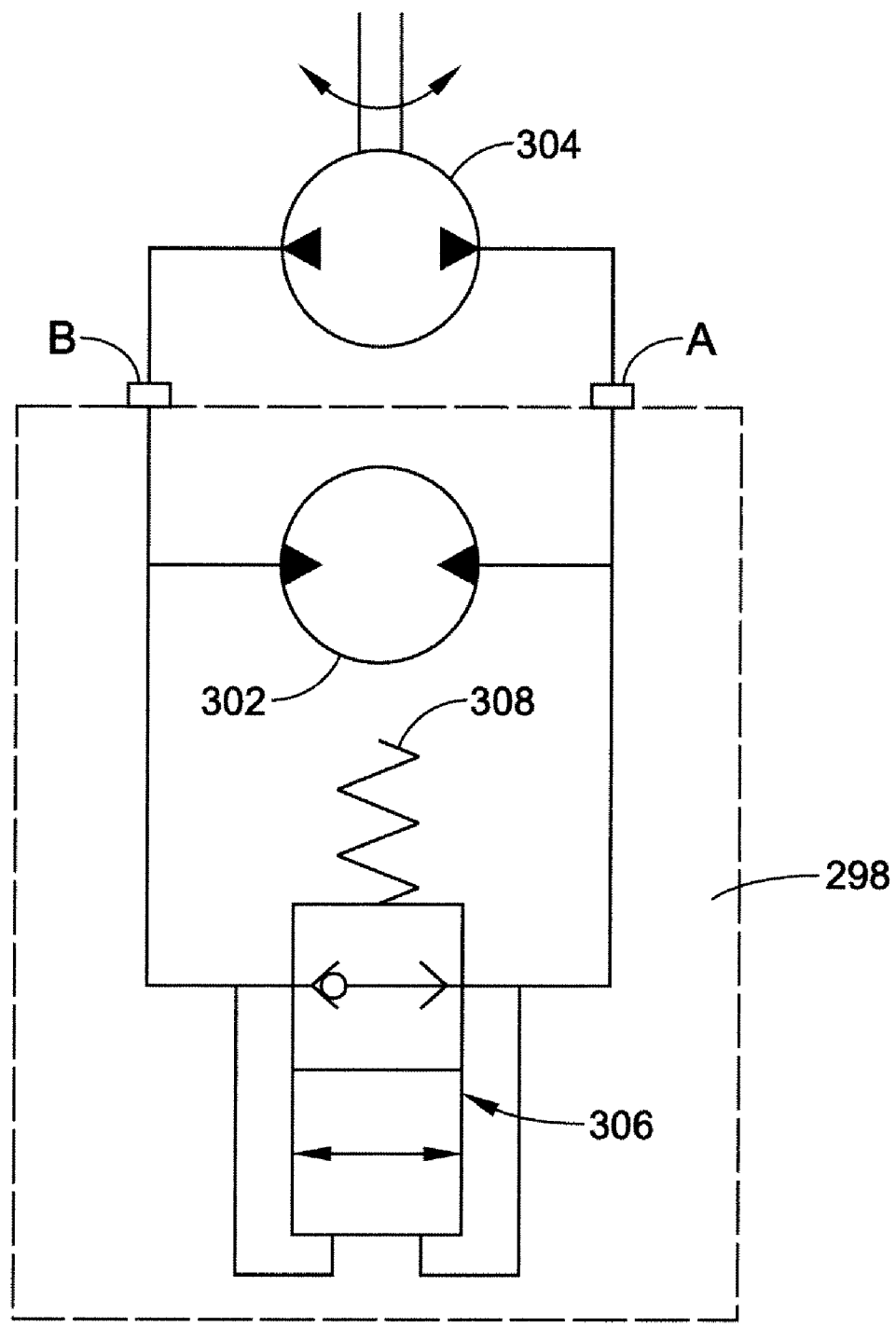
FIG. 5 is a hydraulic circuit depicting an example of a shock valve assembly for use in a hydraulic system.

FIG. 5 schematically depicts a pressure shock absorbing hydraulic transmission system having hydraulic device 298 that includes a first port A and a second port B. The hydraulic device 298 depicted in FIG. 5 includes a hydraulic motor 302, which can be similar to the motor 200 depicted in FIG. 2, that is driven by a pump 304. A shock valve 306, an example of which was more particularly described with reference to FIGS. 1A, 1B, 3 and 4, is disposed in the housing of the device 298. If the pressure at one side of the valve 306, e.g. the side directly connected to port A, is greater than the biasing force of a spring 308, which can be set at a number of different pressures as described above, for the valve, a direct short between port A and B results, thus protecting the motor 302. By having the shock valve located in the hydraulic device 298, which would typically be in the housing of the motor 302, the shock valve 306 can open to dissipate the pressure surge so that too great amount of pressure does not travel through the motor.

The shock valve 306 depicted in FIG. 5 is bi-directional allowing fluid to flow in either direction. Accordingly, a single shock valve can be used with a particular hydraulic device, which should not be deemed limited to only hydraulic motors. Similarly, a single passage (for example, passage 14) can be machined into the hydraulic device. Since the shock valve is disposed in the housing of the device 298, when a pressure surge occurs in the device, for example when the output shaft of the motor 302 abruptly stops, the pressure can be dissipated in the hydraulic system nearer to where the pressure spike occurs, which would be in the motor 302 in the case where the output shaft abruptly stops. Accordingly, the motor 302 can dissipate the pressure surge to inhibit the likelihood of damage occurring to the motor.

The exemplary embodiment has been described with reference to the preferred embodiments. Obviously, modifications and alternations will occur to others upon reading and understanding the preceding detailed description. For example, it is contemplated that the shock valve 16 or any of the alternate shock valves described herein could be employed in a non-hydraulic device through which some other fluid (e.g., a gas) passes and pressure spikes in this other fluid are absorbed by the shock valve. It is intended that the exemplary embodiment be construed as including all such modifications and alterations insofar as they come within the scope of the appended claims or the equivalents thereof.

The invention claimed is:

1. A shock valve assembly for a hydraulic system, comprising: a fluid path extending between a first port and a second port with a shock valve disposed in said fluid path to normally block fluid flow through said fluid path between said first and second ports, said shock valve temporarily opening to permit fluid flow between said first port and said second port through said fluid path when a fluid pressure differential between said ports exceeds a predetermined threshold, fluid flow occurring in a first direction from said first port to said second port through said fluid path when said shock valve is temporarily opened and fluid pressure in said first port is greater than said second port, and fluid flow occurring in a second, reverse direction through said fluid path from said second port to said first port when said shock valve is temporarily opened and fluid pressure in said second port is greater than said first port, wherein an auxiliary fluid passage fluidly connects to said fluid passage at a location between first and second seat portions of said shock valve.

2. The shock valve assembly of claim 1 wherein said shock valve includes at least one valve plug portion urged toward said first seat portion to normally block fluid communication from said first port to said second port when said fluid pressure in said first port is greater than said second port, said at least one valve plug portion urged toward said second seat portion to normally block fluid communication from said second port to said first port when said fluid pressure in said second port is greater than said first port, said first and second seat portions spaced apart from one another in said fluid flow path.

3. The shock valve assembly of claim 2 wherein said at least one valve plug portion includes a first poppet having a first poppet head portion which seats against said first seat portion when said fluid pressure in said first port is greater than said second port and a second poppet having a second poppet head portion which seats against said second seat portion when said fluid pressure in said second port is greater than said first port, said head portions movable relative to one another.

4. The shock valve assembly of claim 3 further including a biasing member disposed between said head portions to urge said head portions to at least a specific spaced apart distance from one another.

5. The shock valve assembly of claim 2 wherein said auxiliary fluid passage fluidly connects to an auxiliary hydraulic device or component.

6. The shock valve assembly of claim 1 wherein said fluid ports are defined in a hydraulic motor housing.

7. The shock valve assembly of claim 6 wherein said shock valve is disposed entirely within said hydraulic motor housing.

8. The shock valve assembly of claim 1 in combination with a hydraulic motor wherein said hydraulic motor includes a rotor set operatively coupled to a drive shaft and a housing having a central opening in which at least one of said rotor set or said drive shaft is at least partially received, said first port and said second port both defined in said housing and each fluidly connected to said central opening such that hydraulic fluid entered into one of said first and second ports normally passes through said central opening by said rotor set and said drive shaft and exits out the other of said first and second ports.

9. The shock valve assembly of claim 8 wherein a pump is operatively and fluidly connected to said first and second ports for driving said hydraulic motor, said pump operable in a first mode wherein hydraulic fluid is directed into said first port and alternatively in a second mode wherein hydraulic fluid is directed into said second port.

10. A shock valve assembly for a hydraulic system, comprising:
a fluid path extending between a first port and a second port;
a shock valve disposed in said fluid path to normally block fluid flow through said fluid path between said first and second ports; and
at least one valve plug portion of said shock valve urged toward a first seat portion to normally block fluid communication from said first port to said second port when said fluid pressure in said first port is greater than said second port, said at least one valve plug portion urged toward a second seat portion to normally block fluid communication from said second port to said first port when said fluid pressure in said second port is greater than said first port, said first and second seat portions spaced apart from one another in said fluid flow path, said at least one valve plug portion further includes a stem portion extending between and maintaining a minimum spacing between said head portions;
wherein said at least one valve plug portion includes a first poppet having a first poppet head portion which seats against said first seat portion when said fluid pressure in said first port is greater than said second port and a second poppet having a second poppet head portion which seats against said second seat portion when said fluid pressure in said second port is greater than said first port, said head portions movable relative to one another; and wherein said shock valve temporarily opening to permit fluid flow between said first port and said second port through said fluid path when a fluid pressure differential between said ports exceeds a predetermined threshold, fluid flow occurring in a first direction from said first port to said second port through said fluid path when said shock valve is temporarily opened and fluid pressure in said first port is greater than said second port, and fluid flow occurring in a second, reverse direction through said fluid path from said second port to said first port when said shock valve is temporarily opened and fluid pressure in said second port is greater than said first port.

11. The shock valve assembly of claim 10 further including a spring annularly received about said stem portion to urge said head portions to at least a specific spaced apart distance from one another.

12. A shock valve assembly for a hydraulic system, comprising:
a fluid path extending between a first port and a second port;
a shock valve disposed in said fluid path to normally block fluid flow through said fluid path between said first and second ports;
said shock valve including at least one valve plug portion urged toward a first seat portion to normally block fluid communication from said first port to said second port when said fluid pressure in said first port is greater than said second port, said at least one valve plug portion urged toward a second seat portion to normally block fluid communication from said second port to said first port when said fluid pressure in said second port is greater than said first port, said first and second seat portions spaced apart from one another in said fluid flow path;
said at least one valve plug portion including a first poppet having a first poppet head portion which seats against said first seat portion when said fluid pressure in said first port is greater than said second port and a second poppet having a second poppet head portion which seats against said second seat portion when said fluid pressure in said second port is greater than said first port, said head portions movable relative to one another; and
a biasing member disposed between said head portions to urge said head portions to at least a specific spaced apart distance from one another;
said shock valve temporarily opening to permit fluid flow between said first port and said second port through said fluid path when a fluid pressure differential between said ports exceeds a predetermined threshold, fluid flow occurring in a first direction from said first port to said second port through said fluid path when said shock valve is temporarily opened and fluid pressure in said first port is greater than said second port, and fluid flow occurring in a second, reverse direction through said fluid path from said second port to said first port when said shock valve is temporarily opened and fluid pressure in said second port is greater than said first port; and
wherein said at least one valve plug portion includes a shock fluid passage defined therethrough, fluid communication between said ports occurring through said shock fluid passage when said fluid pressure differential between said ports exceeds said predetermined threshold, a shock fluid passage closure member is received in said shock fluid passage for blocking fluid communication therethrough except when said pressure differential exceeds said predetermined threshold.

13. The shock valve assembly of claim 12 wherein said shock fluid passage closure member includes:
a first head portion disposed adjacent one end of said shock fluid passage for blocking fluid passage thereby when seated against said first poppet head portion;
a second head portion disposed adjacent another end of said shock fluid passage for blocking fluid passage thereby when seated against said second poppet head portion; and
a stem portion extending between and connecting said first and second head portions, said stem portion received in said shock fluid passage,
wherein said first head portion is movable apart from said first poppet head portion by causing said second head portion to move said second poppet head portion toward said first poppet head portion by overcoming urging of said biasing member when fluid pressure in said second port is greater than said first port such that said fluid pressure differential between said first port and said second port exceeds said predetermined threshold, and
wherein said second head portion is movable apart from said second poppet head portion by causing said first head portion to move said first poppet head portion toward said second poppet head portion by overcoming urging of said biasing member when fluid pressure in said first port is greater than said second port such that said fluid pressure differential between said second port and said first port exceeds said predetermined threshold.

14. The shock valve assembly of claim 12 wherein spacing between said first and second closure member head portions defines a maximum amount of spacing between said first and second poppet members.

15. The shock valve assembly of claim 12 wherein said first head portion and said stem portion are together formed as a fastener having a threaded region located on said stem portion, said second head portion formed as a threaded member threadedly received on said threaded region, said spacing between said first and second head portions adjustable by moving said threaded member along said threaded region of said stem portion to thereby adjust said maximum amount of spacing between said first and second poppet members.

16. A valve assembly for a hydraulic system, comprising: a fluid path extending between a first port and a second port with a valve disposed in said fluid path to block fluid flow through said fluid path between said first and second ports, said valve including at least one valve plug portion urged toward a first seat portion to block fluid communication from said first port to said second port when said fluid pressure in said first port is greater than said second port, said at least one valve plug portion urged toward a second seat portion to block fluid communication from said second port to said first port when said fluid pressure in said second port is greater than said first port, said first and second seat portions spaced apart from one another in said fluid path, an auxiliary fluid passage fluidly connecting to said fluid passage at a location between said first and second seat portions.

17. The valve assembly of claim 16 wherein said at least one valve plug portion includes a first valve member urged toward said first seat portion to block fluid communication from said first port to said second port and includes a second member urged toward said second seat portion to block fluid communication from said second port to said first port, and further includes a spring disposed between said first and second members for urging each of said first and second members against said respective first and second seat portions.

18. A hydraulic motor having a shock absorbing valve assembly, comprising:
a rotor set operatively coupled to a drive shaft;
a housing having a central opening in which at least one of said rotor set or said drive shaft is at least partially received;
a first port and a second port defined in said housing and each fluidly connected to said central opening such that hydraulic fluid entered into one of said first and second ports normally passes through said central opening by said rotor set and said drive shaft and exits out the other of said first and second ports; and
a short-circuit fluid passage fluidly connected directly to said first port and said second port for selectively passing hydraulic fluid directly between said ports to absorb pressure shocks; and
a bi-directional valve assembly disposed within said fluid passage for selectively allowing fluid communication from said first port to said second port when the motor is operating in a first direction and selectively allowing fluid communication from said second port to said first port when the motor is operating in a second reverse direction, selective allowance of fluid communication between said first and second ports through said bi-directional valve occurring when a pressure differential between said first and second ports exceeds a predetermined threshold and until said pressure differential is below said predetermined threshold, said bi-directional valve assembly including:
a first poppet head portion seated against a corresponding first seat portion when fluid pressure in said first port exceeds fluid pressure in said second port,
a second poppet head portion seated against a corresponding second seat portion when fluid pressure in said second port exceeds fluid pressure in said first port,
at least one of said first and second poppet head portions having a shock fluid passage defined therethrough, and
a shock fluid passage closure member received in said shock fluid passage in a closed position to block fluid communication therethrough and temporarily movable to an open position when said pressure differential between said first and second ports exceeds said predetermined threshold.

19. The hydraulic motor of claim 18 wherein said bi-directional valve assembly is generally in a closed state when said pressure differential is less than predetermined threshold, said bi-directional valve assembly blocking fluid communication between said ports through said short-circuit fluid passage when in said closed state.

20. The hydraulic motor of claim 18 further including a biasing member disposed between said head portions to urge said head portions apart, said closure member movable to said open position with an unseated one of said first and second head portions against an urging of said biasing member when said pressure differential exceeds said predetermined threshold and urged to said closed position by said biasing member.

21. The hydraulic motor of claim 20 wherein said closure member is adjustable to selectively move said head portions toward one another a selected distance against said urging of said biasing member and thereby adjust said predetermined threshold.

22. The hydraulic motor of claim 18 wherein said bi-directional valve assembly includes at least one valve plug portion having a first poppet with a first poppet head portion which seats against a first seat portion when said fluid pressure in said first port is greater than said second port and a second poppet with a second poppet head portion which seats against a second seat portion when said fluid pressure in said second port is greater than said first port, said at least one valve plug portion further including a stem portion extending between and maintaining a minimum spacing between said head portions.

23. The hydraulic motor of claim 18, wherein said short-circuit fluid passage and said bi-directional valve assembly are disposed entirely within said hydraulic motor.

24. A hydraulic motor having a shock absorbing valve assembly, comprising:

a rotor set operatively coupled to a drive shaft;

a housing having a central opening in which at least one of said rotor set or said drive shaft is at least partially received;

a first port and a second port defined in said housing and each fluidly connected to said central opening such that hydraulic fluid entered into one of said first and second ports normally passes through said central opening by said rotor set and said drive shaft and exits out the other of said first and second ports; and a short-circuit fluid passage fluidly connected directly to said first port and said second port for selectively passing hydraulic fluid directly between said ports to absorb pressure shocks;

a bi-directional valve assembly disposed within said fluid passage for selectively allowing fluid communication from said first port to said second port when the motor is operating in a first direction and selectively allowing fluid communication from said second port to said first port when the motor is operating in a second reverse direction, selective allowance of fluid communication between said first and second ports through said bi-directional valve occurring when a pressure differential between said first and second ports exceeds a predetermined threshold and until said pressure differential is below said predetermined threshold; and an auxiliary fluid passage fluidly connected to said fluid passage between said first port and said second port, said first port in fluid communication with said auxiliary fluid passage when fluid pressure is greater in said first port than said second port, and said second port in fluid communication with said auxiliary fluid passage when fluid pressure in said second port is greater than said first port.

* * * * *